Sept. 22, 1959   H. W. ROEBER   2,905,802
CATHODE TAB FEED AND WELDER
Filed June 3, 1957   10 Sheets-Sheet 1

INVENTOR
Henry W. Roeber
BY Michael Hertz,
ATTORNEY

Sept. 22, 1959  H. W. ROEBER  2,905,802
CATHODE TAB FEED AND WELDER
Filed June 3, 1957  10 Sheets-Sheet 2

INVENTOR
Henry W. Roeber
BY Michael Hertz,
ATTORNEY

Sept. 22, 1959 H. W. ROEBER 2,905,802
CATHODE TAB FEED AND WELDER
Filed June 3, 1957 10 Sheets-Sheet 3
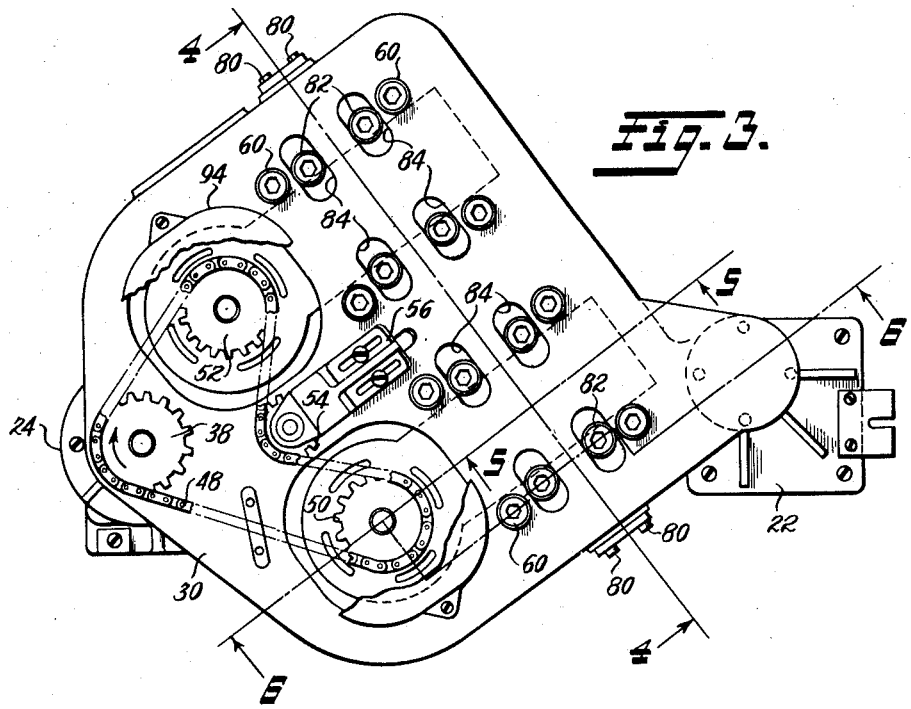
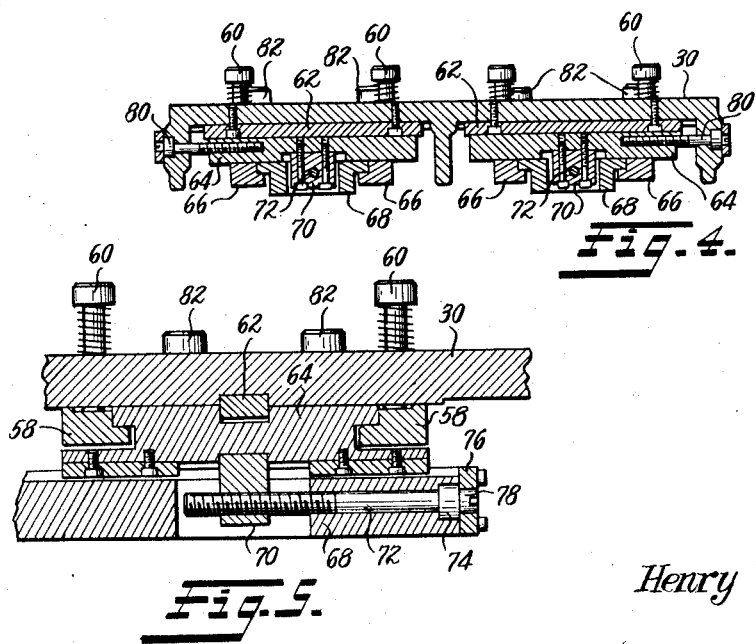
INVENTOR
Henry W. Roeber
BY Michael Hertz,
ATTORNEY Sept. 22, 1959 H. W. ROEBER 2,905,802
CATHODE TAB FEED AND WELDER
Filed June 3, 1957 10 Sheets-Sheet 4
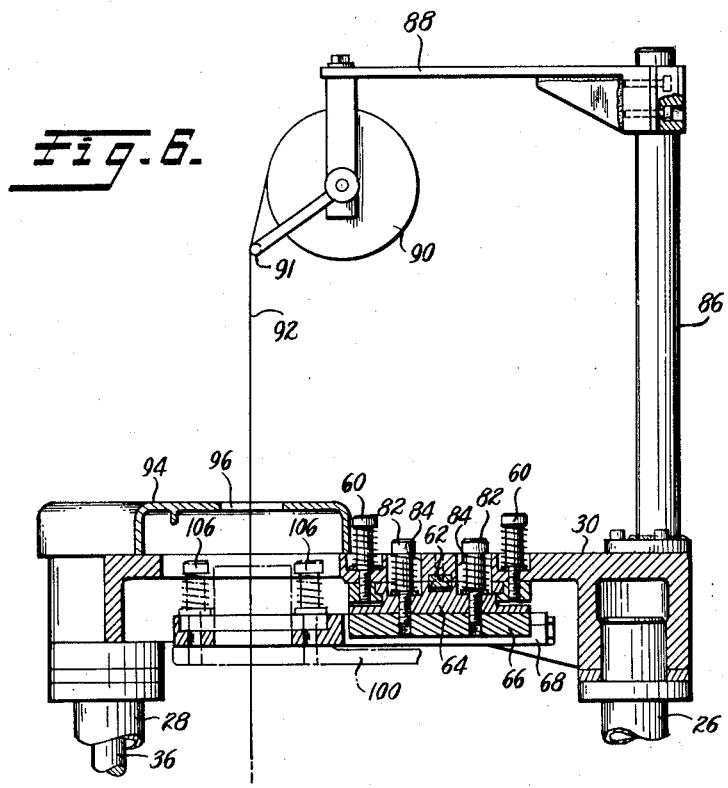
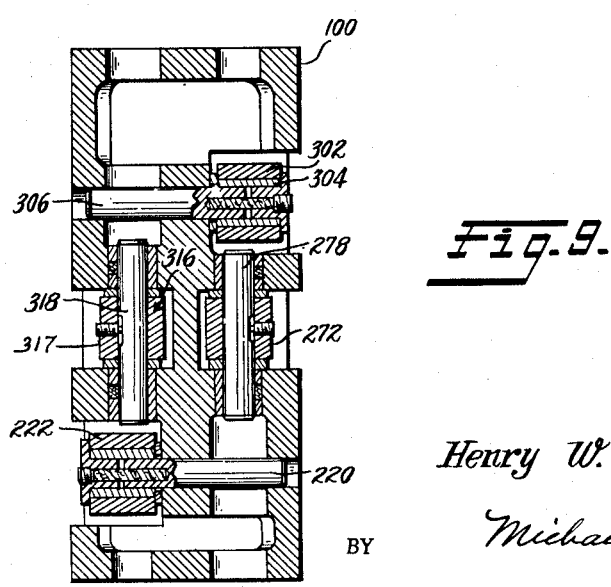
INVENTOR
Henry W. Roeber
BY Michael Hertz
ATTORNEY

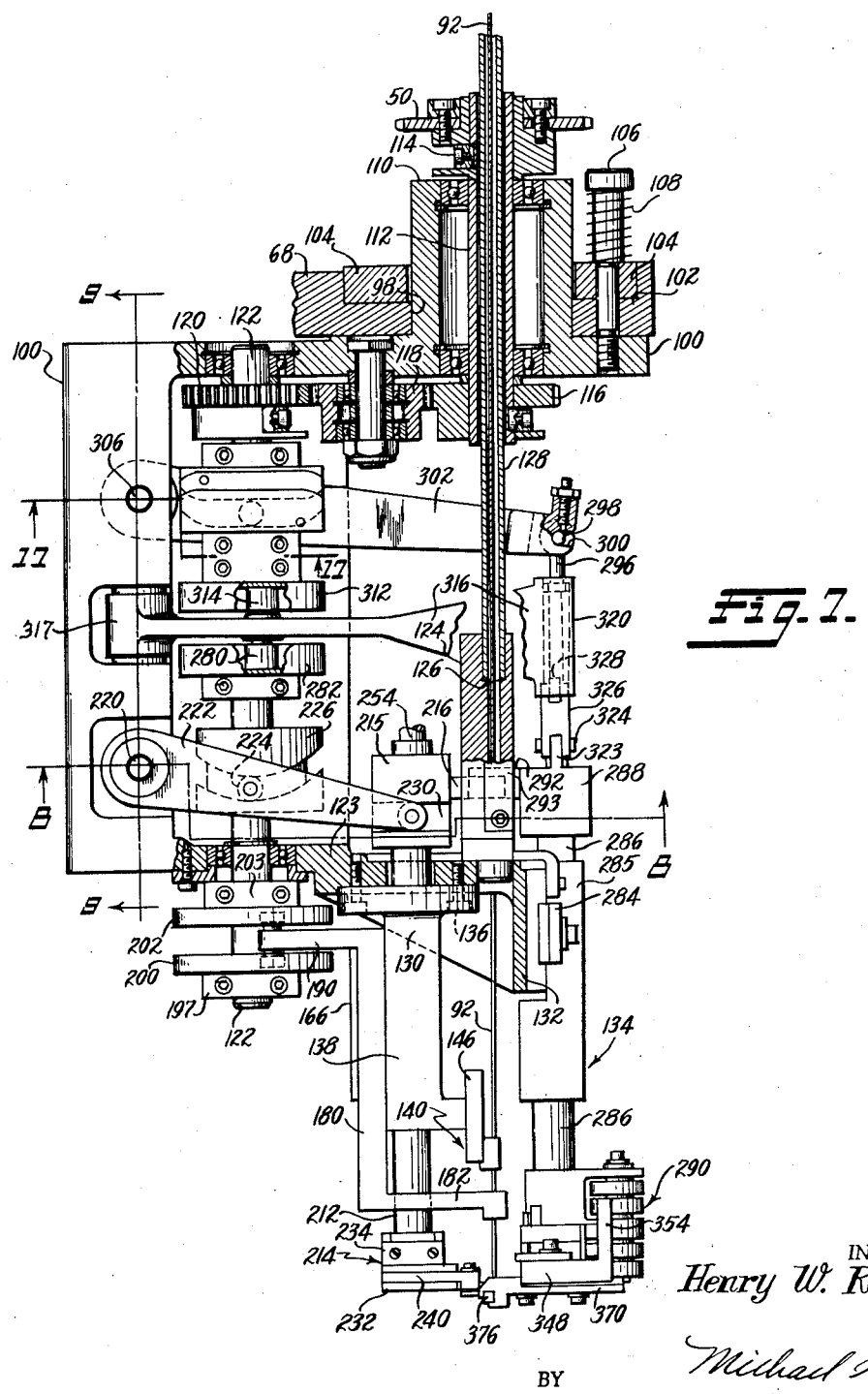

Sept. 22, 1959     H. W. ROEBER     2,905,802
CATHODE TAB FEED AND WELDER

Filed June 3, 1957     10 Sheets-Sheet 6

INVENTOR
Henry W. Roeber

BY Michael Hertz

ATTORNEY

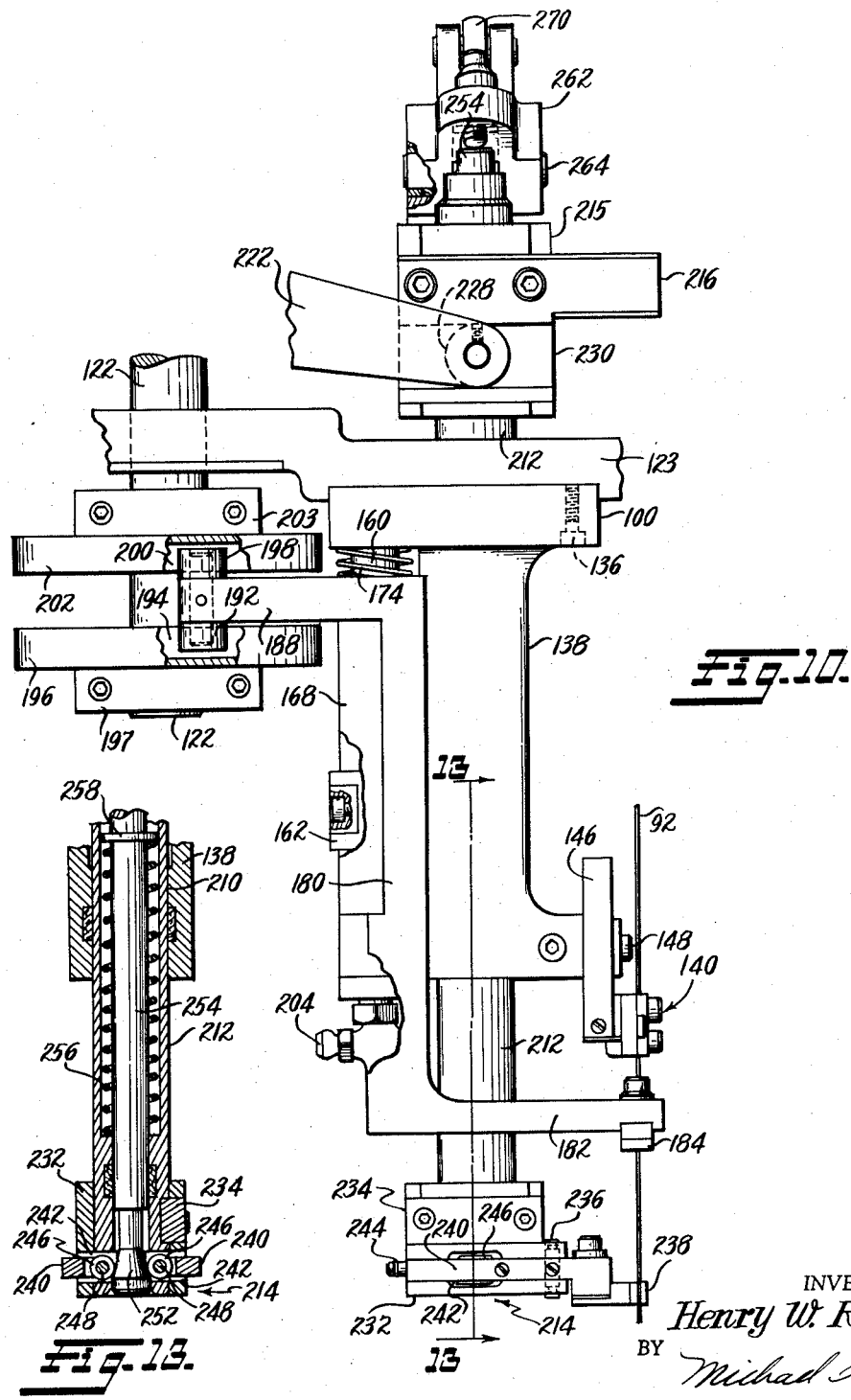

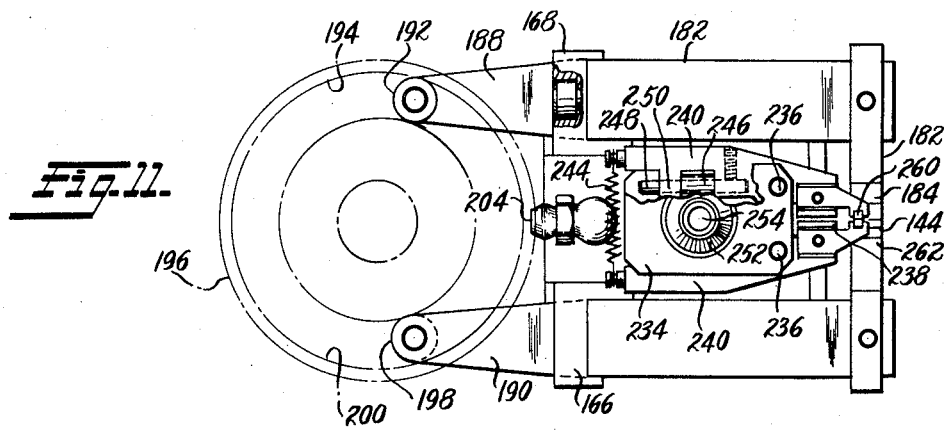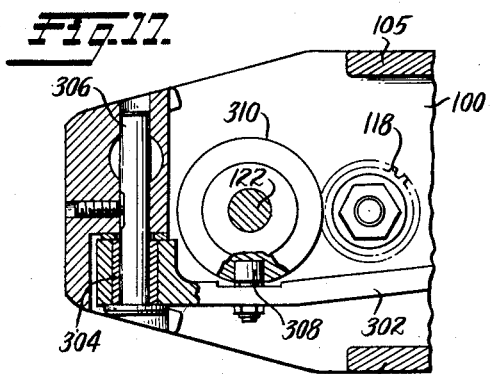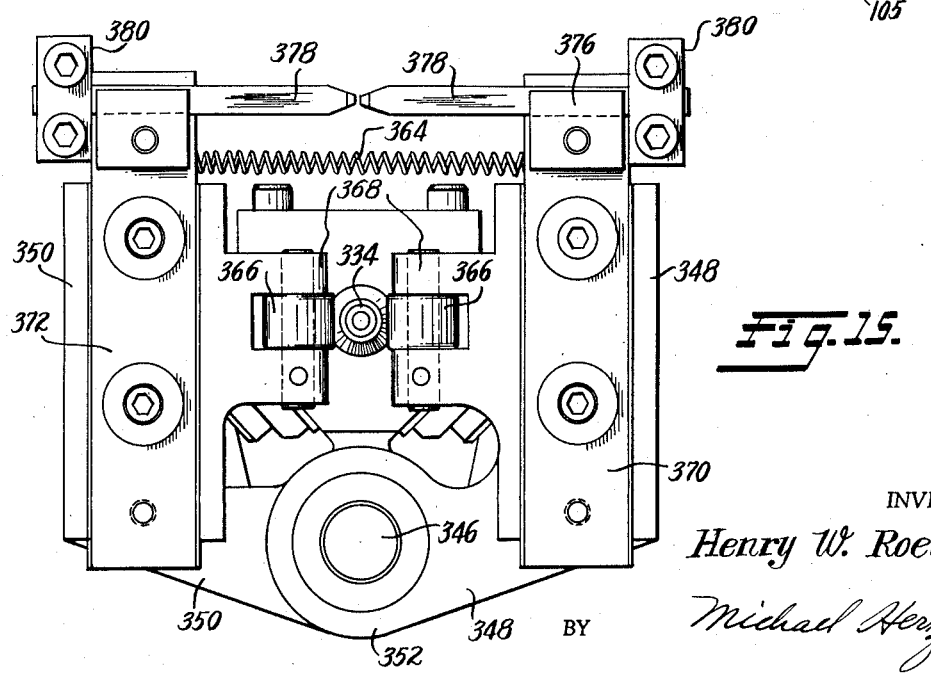

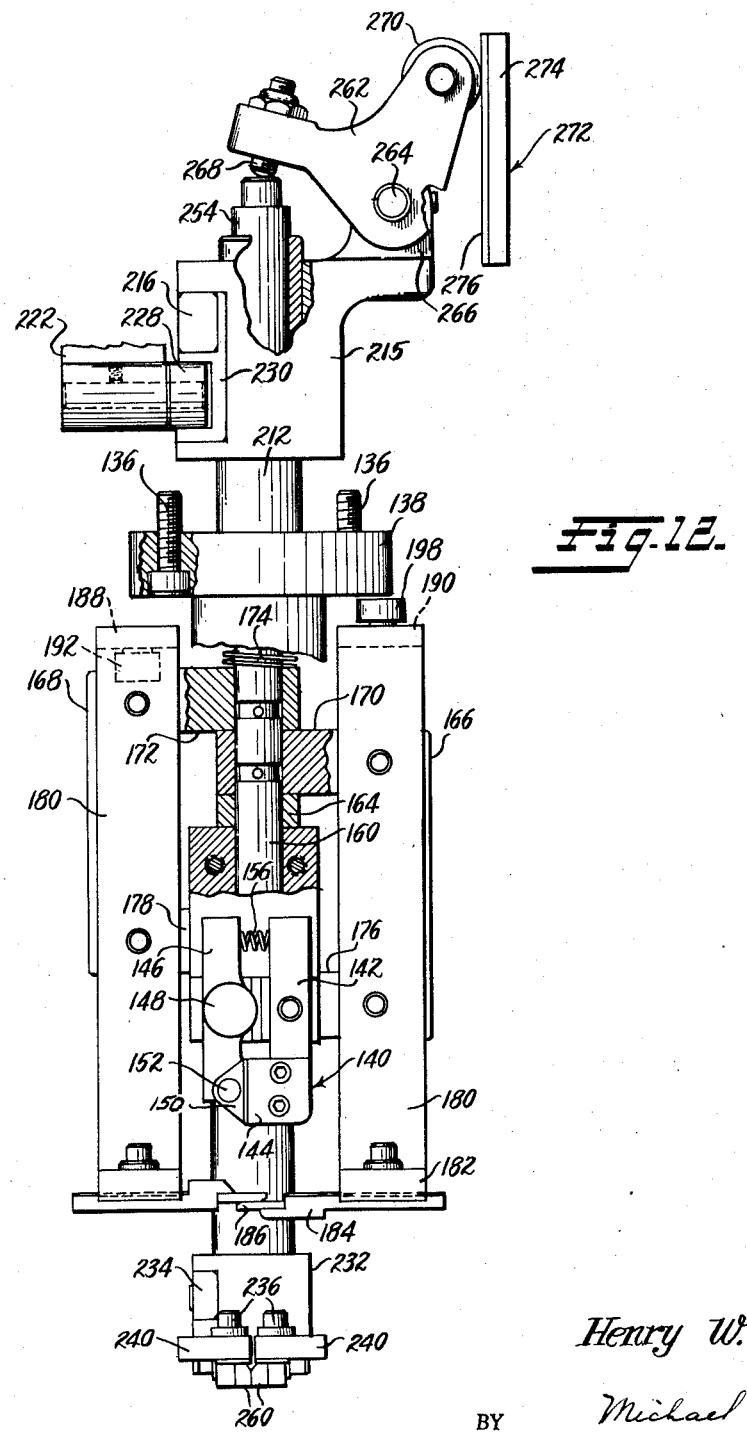

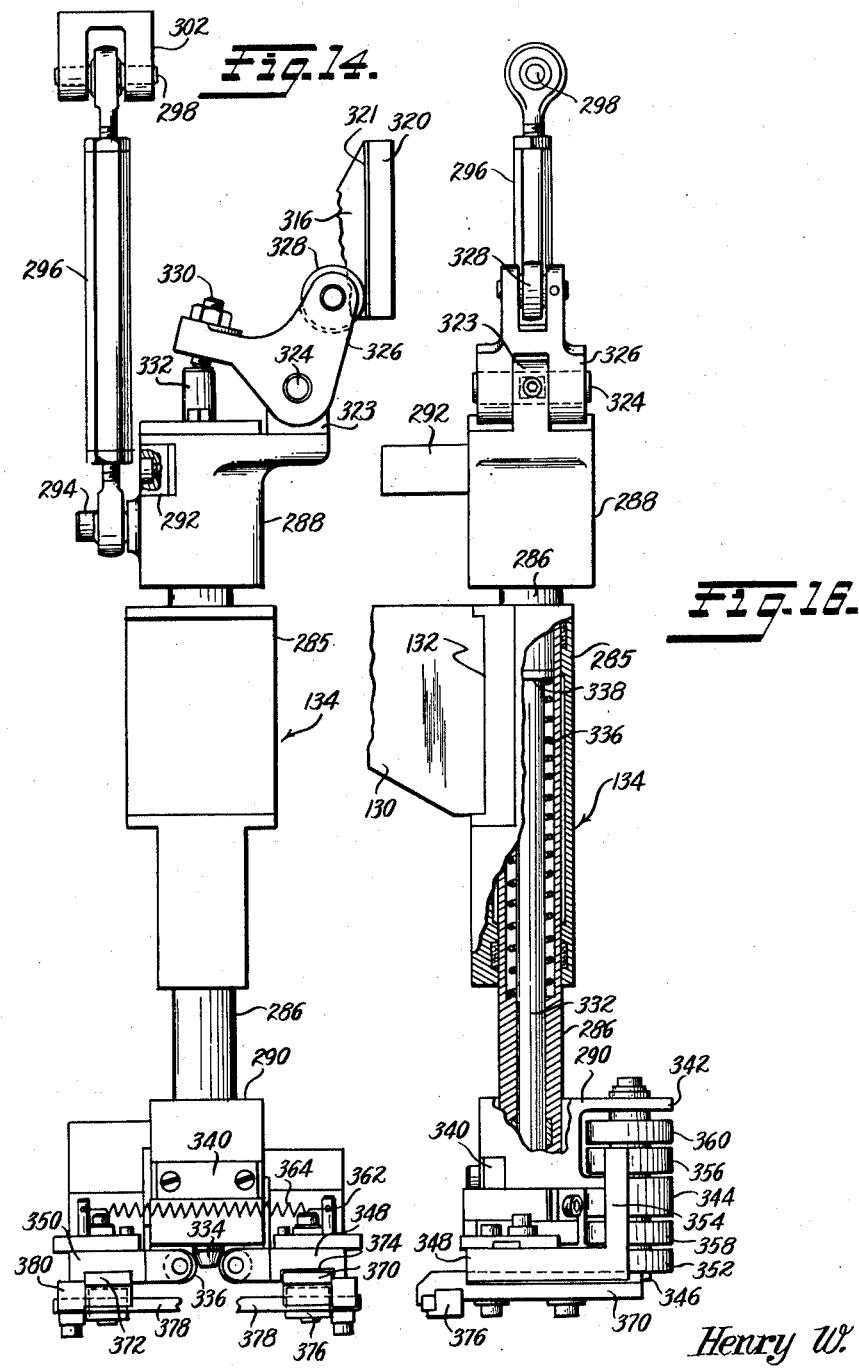

United States Patent Office 2,905,802
Patented Sept. 22, 1959

2,905,802

CATHODE TAB FEED AND WELDER

Henry W. Roeber, Emporium, Pa., assignor, by mesne assignments, to Sylvania Electric Products Inc., Wilmington, Del., a corporation of Delaware Application June 3, 1957, Serial No. 663,250

10 Claims. (Cl. 219—79)

This invention relates to machines utilized in electron tube manufacture and in particular to the means for securing a conductor tab to an electrode after the electrodes have been associated with insulating spacers to form a mount.

Many electron tubes now have their electrode elements automatically assembled, and mechanism has been created to progressively build up a tube mount by first placing an insulating wafer in an indexible holder and then progressively and at successive stations inserting electrode elements into the wafer until all of the elements have been assembled and then adding an additional wafer to hold all parts in properly spaced relationship.

This invention deals with the feeding and cutting of tab material to a welder and the welding of a tab to at least one of the electrodes, which tab is be subsequently welded to one of the lead in wires of a stem or base of a tube.

It is an object of this invention to make the machine of such construction as to render it readily adaptable to the handling of a number of types of electron tube mounts and to affix a tab to any selected electrode element of the mount.

It is a further object of the invention to provide a novel means for vertically feeding tab material from a supply mounted on top of the machine, cut the tab material, transport the cut off portion forming the tab down to an electrode on an underlying support and attach the tab to the electrode.

It is yet another object of the invention to make the feeding, cutting and tab welding mechanism compact and sturdy.

Other objects will become evident upon further consideration of the following specification when taken in conjunction with the accompanying drawings in which:

Fig. 3 is a top plan view of Fig. 2 with a portion of a cover plate broken away to expose hidden parts, some of which are shown in dotted lines.

Fig. 4 is a section on the line 4—4 of Fig. 3.

Fig. 5 is a section on the line 5—5 of Fig. 3.

Fig. 6 is a section on the line 6—6 of Fig. 3.

Fig. 7 is a partially sectioned elevation showing in detail cam means and controlled lever mechanisms for operating component portions of the machine, parts being broken away for better showing the invention.

Fig. 9 is a section on the line 9—9 of Fig. 7.

Fig. 10 is an enlarged view of the mechanism for transporting the tape, and is a part shown in phantom in Fig. 7.

Fig. 11 is a bottom view of the mechanism shown in Fig. 10.

Fig. 12 is a side view of the mechanism shown in Fig. 10 as it would appear when looking at it from the right hand edge of the drawing.

Fig. 13 is a section on the line 13—13 of Fig. 10.

Fig. 14 is an elevational view of the welding apparatus together with some of its operating mechanism.

Fig. 15 is a bottom view of Fig. 14.

Fig. 16 is a side elevation of the welder, parts being shown in section.

Fig. 17 is a section on the line 17—17 of Fig. 7.

Fig. 18 shows an electron tube mount with cathode tabs attached, such as might have been made by the machine of this invention.

Figure 1:
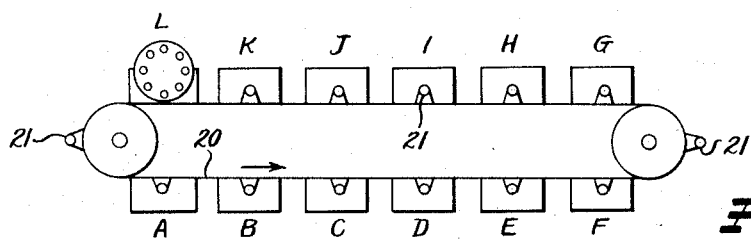
Fig. 1 is a diagrammatic representation of the type of machine to which this invention pertains.

Considering the drawings in greater detail, in Fig. 1 there is disclosed in diagrammatic form a machine for manufacturing electron mounts. There is represented an endless conveyor 20 carrying equally spaced holders 21 for receiving parts of an electron tube as the holders are indexed from station to station. The stations are indicated by the letters A to L. At station A, for example, an insulating spacer such as of mica may be placed in the holder; at station B a cathode may be inserted in a prepunched hole in the mica; at station C a grid may be added and so on until at a certain station, for example K, a top spacer element or mica may be added to the assembly to hold all of the electrodes in properly spaced and assembled relationship. At station L either by automatic mechanism or by hand, the assembled electrode structure or mount may be loaded into receptacles in a turret such as the turret T, Fig. 2a. Since none of the above is the specific subject matter of this invention, and is merely added to give background information, no further description of how the mount is assembled need be given. It should be noted however that the turret T is indexible to a position beneath the tools of this invention, the turret being shown partly in section in Fig. 2a.

Figure 2:
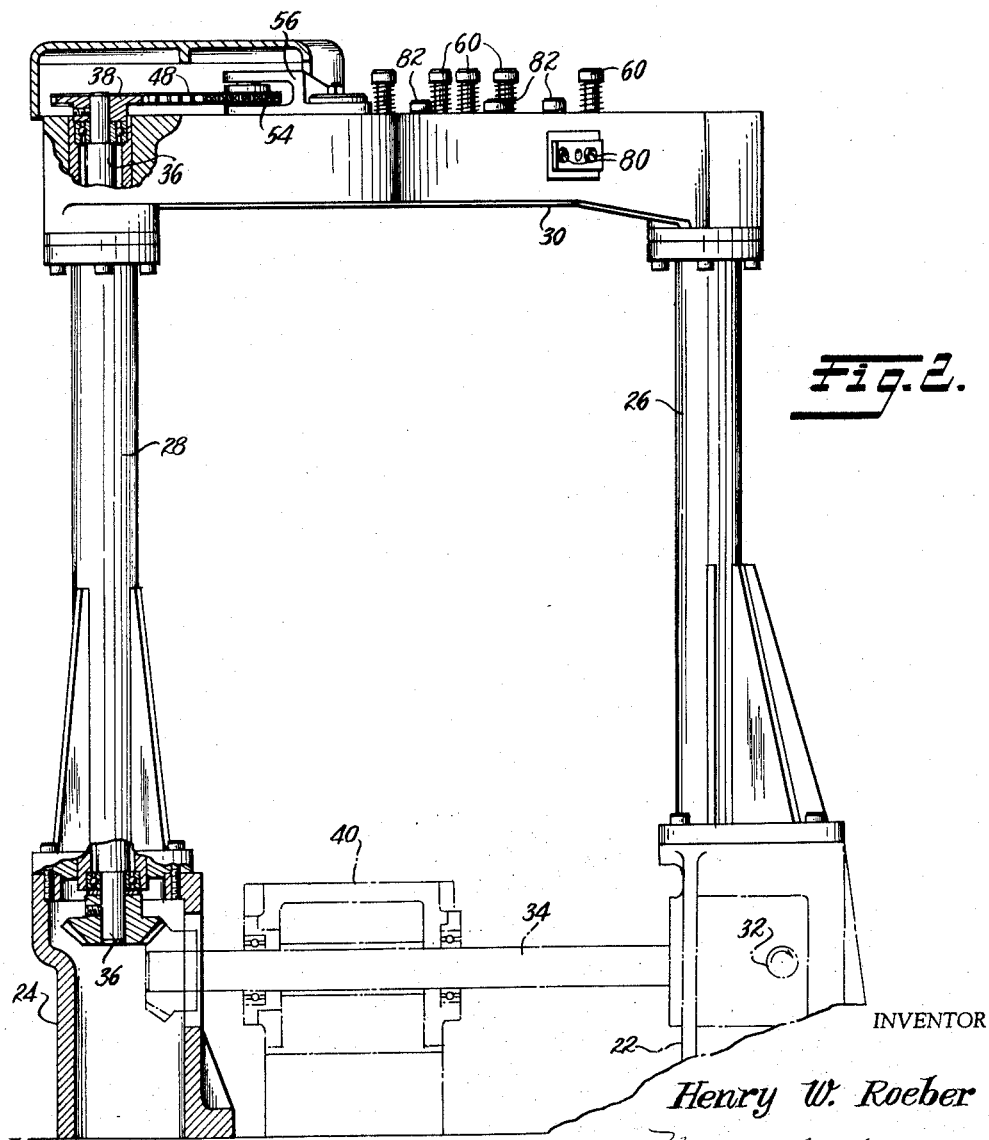
Fig. 2 is an elevation of the support for the feeding, cutting and welding mechanisms, parts in phantom showing drive means derived from the main machine.
Figure 2A:
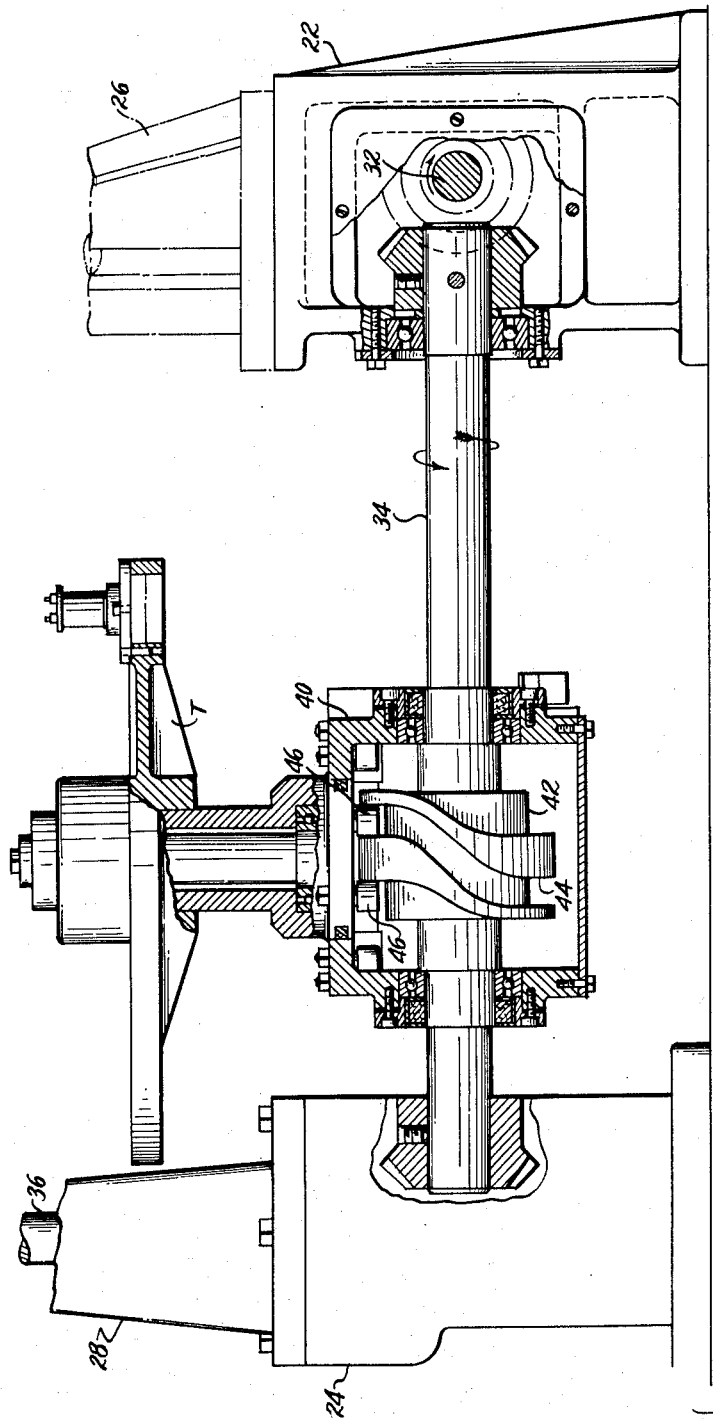
Fig. 2a is a view of the lower portion of Fig. 2 with some of those portions which were shown in phantom now shown in full lines and vice versa, means also being shown to drive a turret to index the mounts to below the tab feeder, cutter and welder.

Above the turret and forming part of the base of the machine, there is a gantry-like structure comprised of two pedestals 22 and 24 surmounted by two hollow posts 26 and 28, across the top of which is a support plate 30. Connected in any suitable manner with the main drive shaft (not shown) of the machine diagrammed in Fig. 1 and so as to be driven in synchronism with the main drive shaft is a take-off shaft 32 leading into the pedestal 22. Geared to this shaft and extending between the pedestals 22 and 24 is a horizontal transmission drive shaft 34 and geared to this shaft is the vertical drive shaft 36 mounted in bearings in post 28 and to the top of which and above the plate 30 is affixed a sprocket 38. On the horizontal transmission shaft and within a housing 40, see Fig. 2a, is affixed a conventional barrel cam 42 with worm ribs 44 engaging the follower rollers 46 affixed to the underside of the turret in order to index the same. The sprocket 38, see Fig. 3, drives a chain 48 which may be trained about a pair of driven sprockets 50 and 52 and about an idler 54 shiftable to tighten the chain, as is common in the art, as by being mounted on an adjustable block 56. The chain is trained about two sprockets 50 and 52 when there are two sets of tab feeding, cutting and welding mechanisms, but is trained about only one sprocket and the idler 54 if only one such set is used.

To support the sets of mechanisms referred to, the underside of the plate 30, see Figs. 4 to 6, is provided with ways 58 spring held to the plate by spring pressed studs 60 threaded into the ways and passing through openings in the plate 30. Slidable in each of a pair of these ways and guided by a key 62 set into the bottom of the plate 30 is an upper slide 64. Resiliently held to its lower surface is a second set of ways 66 (see Fig. 4) at right angles to the ways 58 and supporting a lower slide 68. Fastened to the underside of the upper slide 64 is an internally threaded block 70 cooperating with a screw 72 (see Fig. 5) whose head 74 is confined between the end of slide 68 and a cap plate 76 and which has a reduced slotted end 78 extending through a hole in the cap plate to provide access for engagement with a tool for rotating the screw. Each of the upper slides 64 may be adjusted by rotation of screws 80 similar to the screws 72. The ways 66 are spring held to the underside of slide 64, see Fig. 6, by spring pressed studs 82 threaded into the ways 66, reacting against the slides 64, and riding in slots 84 in the plate 30.

Affixed to the top of plate 30 and above post 26 (see Fig. 6) is a tubular column 86 adjustably supporting a horizontal arm 88 from the end of which is suitably supported a spool 90 containing a supply of metal tape 92 to be cut up into tab lengths and welded to a selected electrode; a guide bar 91 is provided to guide the tape to a proper feeding position. Enclosing the chain sprockets and fastened to the upper surface of the plate 30 is a cap 94 provided with openings 96 through which the tapes may be threaded.

Each of the lower slides 68 extends laterally beyond the lower ways 66 and is provided at its free end with an opening 98 (see Fig. 7) forming a bearing for a generally U-shaped frame 100 and a seat 102 for a friction ring 104. The U-shaped frame has integral vertical connecting webs 105, Fig. 8, for strengthening the frame. Passing through openings in the ring 104 and slide 68 and threaded into openings in the U-shaped frame 100 are locking screws 106 bearing against stiff springs 108 which in turn bear against the friction ring 104. By loosening the screws 106, the U-shaped frame may be rotated about the axis of the opening 98 in slide 68 and then pressure may again be applied to the friction ring via the screws and springs to lock the U-shaped frame in place in its angularly adjusted position. The U-shaped frame has an upstanding bearing collar 110 within which is rotatably supported a hollow sleeve 112 to the upper end of which is secured the chain driven sprocket, as for example 50, whose hub is fastened to the sleeve in any convenient manner as indicated at 114. At the lower end of the sleeve is similarly fastened a spur gear 116, meshing with an idler gear 118 in turn meshing with a cam shaft secured gear 120 mounted on the cam shaft 122, in turn mounted in the U-shaped frame.

The lower leg 123 of the U-shaped frame supports a casting 124 having a bore for the passage of the tape 92 and a shoulder 126 for seating a cylindrical tube 128 extending loosely through the sleeve 112 and accommodating free passage of the tape therethrough.

The lower leg of the frame is webbed for reinforcement of the leg, as indicated at 130 and provides a front vertical face to which a welding unit 134 is attached, as will be described.

Attached to the under surface of the lower leg 123 of the U-shaped frame as by screws 136 (see Figs. 10 and 12) is a narrow subframe 138 at the lower end of which, adjacent the path of travel of the tape, is a tape brake 140. This brake comprises a fixed vertical bar 142 having a horizontal projection 144 carrying a rubber block or other suitable resilient frictional material and a second bar 146 pivoted at 148 and carrying a lower block 150 pivoted to the lower end of bar 146 at 152 and which also may be provided with friction material cooperating with the material on projection 144. A spring 156 urges the two rubber equipped portions toward the tape fed therebetween and acts as a continuous frictional brake on the tape.

Also mounted fixedly in the subframe is a vertical shaft 160 and fixed to this shaft about midway of its length is a spacer block 162 above which is a spacer collar 164. Pivotally mounted on the shaft, like leaves of a hinge, is a pair of U-shaped frames 166 and 168, see Figs. 7, 10, 11 and 12. The upper arms 170 and 172 of the frames are held in engagement with one another, to prevent looseness of parts, by a spring 174 surrounding the shaft 160. The lower arms of the frames are indicated at 176 and 178. Mounted on each of the two frames is a vertical bar 180 having at its lower end a forwardly extending arm 182 which at the end has secured to it a cutter bar 184 with hardened cutter blade 186. At the upper ends of the bars 180 are rearwardly extending arms 188 and 190, the arm 188 supporting cam follower roller 192 below the arm riding in a cam track 194 in a cam disc 196 fixedly mounted on cam shaft 122 by its collar 197, while the arm 190 supports cam follower roller 198 above the arm riding in a cam track 200 in cam disk 202 also fixed on cam shaft 122 by its collar 203 (see also Fig. 7). On rotation of the cam shaft the cam discs will cause the cutter blades to close on the tape 92 in proper timed relation to the other parts, as will be set forth.

A grease fitting 204 is applied to the lower end of shaft 160 in order to lubricate parts through suitable ducts in the shaft.

The subframe 138, see Figs. 10 to 13, provides a bearing, as indicated at 210, within which is vertically slidable a hollow shaft 212 carrying tape feed mechanism 214 at its lower end. Near the upper end of the shaft is affixed a cap 215, see Fig. 12, by means of a combined strap and guide arm 216. The strap lies in a channeled out flat portion in the cap and shaft 212 and is fastened to the cap. This secures the cap to the shaft without possibility of relative rotation. The free end of the strap rides in a vertical slot between the casting 124 and a bar 217 which is fastened at its lower end to casting 124. The casting while wide at the bottom is narrowed enough above the sectioned portion shown in Fig. 8 to snugly accommodate the free end of the strap. This construction prevents rotation of shaft 212 and the feed mechanism 214, so that the feed mechanism will always be in proper position relative to the tape 92.

Figure 7A:
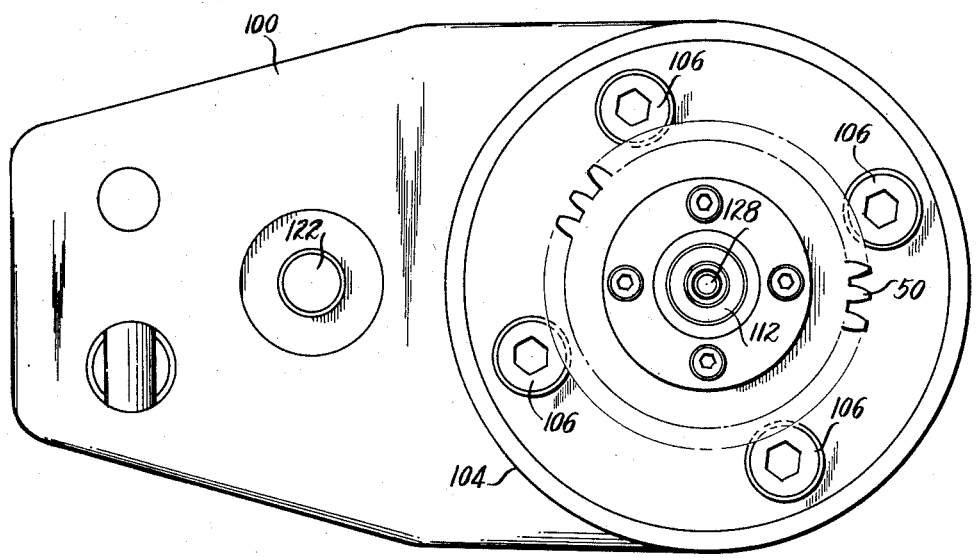
Fig. 7a is a top view of Fig. 7, with a lower slide not shown.
Figure 8:
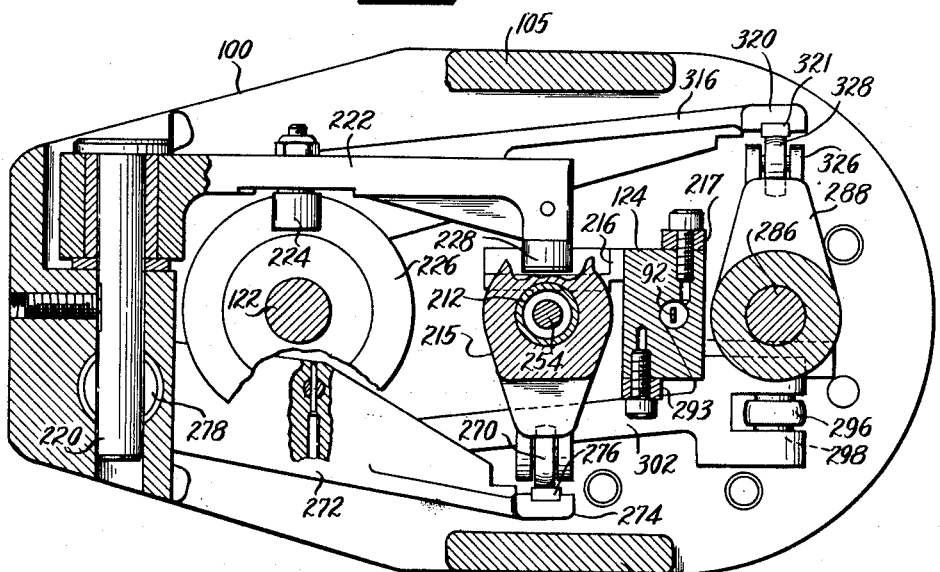
Fig. 8 is a section along the line 8—8 of Fig. 7.

Referring to Fig. 8, pivotally mounted on a fixed stub shaft 220 mounted in the bight portion of the U-shaped frame is a lever arm 222 having a cam follower 224 riding within a groove in cam 226 fast on shaft 122 and having an antifriction roller 228 at its free end engaging a slotted portion 230, Figs. 10 and 12, below the bar 216 and forming part of the cap 215. Rotation of the cam 226 therefore raises and lowers the tape feed mechanism 214. The tape feed mechanism is narrow enough to be able to move in between the cutter bar supporting arms 182 and comprises an apertured block 232 surrounding and nonrotatably secured to the shaft 212 as by a bar 234 fastened to the block and lying in an undercut flat portion of the shaft similar to the bar 216, the block being provided at its front end with two pivot pins 236 pivoting a pair of jaws 238 having operating arms 240 extending rearwardly of the pivots and sliding more or less into and out of horizontal slotted portions 242 in the block 232. The rear ends of the arms 240 are joined together by a tensioned spring 244, Fig. 11, operative to tend to separate the jaws. The jaws are brought together by means of cam followers in the form of horizontal rollers 246, Figs. 11 and 13, mounted on pintles 248 set in ears 250 of the arms 240 and operated by a cone 252 at the lower end of a rod 254 vertically reciprocatable within the shaft 212. Normally the rod is thrust upwardly, and therefore the jaws brought to closed position by a spring 256 reacting between a seat within the shaft 212 and a collar 258 fastened on the rod. The jaws 238 are provided with rubber blocks 260, or the like Fig. 11, to engage and grip the tape 92. When the shaft 212 is in up position, the jaws are operated under control of rod 254 to engage the tape. When the tape is so engaged, downward movement of the shaft 212 will advance the tape sufficiently to enable the cutter blade to sever a tab off the tape. Further downward movement of the shaft and gripper jaws will bring the tab to welding position. After tab welding, the rod 254 is depressed, as will be described, and the jaws are released to the control of the spring 244 in order to release the tab. All of this is effected by suitable cam mechanism, involving cam 226 already described and by additional cam and cam controlled mechanism for operating the rod 254. This additional mechanism comprises a bell crank 262, Fig. 12, mounted on a pintle 264 in an ear 266 on the cap, said bell crank at one end having an adjustable screw 268 engaging the top of rod 254. The other end of the bell crank is provided with a roller 270 engaged by a lever arm 272, see also Fig. 8, having a flaring end 274 as will be later more fully described, furnished with a vertical wear plate 276 which forms a trackway for the roller 270, the flared end permitting the bell crank to be operated by the arm 272 in either the up or down position of shaft 212. The lever 272 is fastened to a vertical stub axle 278 mounted on bearings in the bight portion of the U-shaped frame and is provided intermediate its ends with a roller 280, see Fig. 7, cooperating with a groove in the upper face of a lower cam disc 282 fixed on cam shaft 122. In Fig. 7, the arm on which roller 280 is mounted is not shown but it is shorter than and directly behind another lever indicated as 316 which also has a flared end, similar in shape to the flared end 274 on lever 272. Whatever the position of the roller 270 with respect to the flared end 274, it is obvious that pivoting of the bell crank 262 is always under control of the groove in cam disc 282. Therefore, by proper contouring of the groove, the gripping jaws may be opened and closed as necessary to effect a feeding of the tab material and the tab.

The welding unit 134, as stated heretofore, is mounted on the front face 132 of the lower leg of the U-shaped adjustable frame 100, which it will be remembered can be adjusted by means of the sets of ways and slides earlier described in any desired lateral direction and which can be adjusted rotationally to any desired position about the axis of tube 128. These adjustments enable the feeding device, cutter and welder to be brought opposite and operate with respect to any selected electrode on many types of mounts.

Means are provided for raising and lowering of the welding electrodes between welding operations to allow for indexing of the mounts on the turret T since otherwise the welder parts would be in the path of movement of the mounts. Means are also provided for opening and closing the welder electrode holding jaws at the proper times.

To effect the raising and lowering of the welder unit 134, the following instrumentalities are employed. Fastened to the front face 132, Fig. 7, of the leg 123 by any convenient means, as by clamp block 284, is a bearing block 285, see Figs. 14 and 16, slidably retaining a welder shaft 286 having mounted on its upper end a cap 288 and at its lower end a foot 290. The cap 288 is mounted on the shaft and is guided by a combined guide arm and strap 292 similar to the part 216, and which rides, like part 216, in a space between the casting 124 and a bar 293. On a side of the cap 288 is a pivot pin 294 connected by a drag link 296 with a pivot pin 298 resting in a crotch 300, see Fig. 7, in a lever 302, said lever, see Figs. 9 and 17, being pivoted on a bearing 304 mounted on a horizontal pin 306 in the upper portion of the bight portion of frame 100. Intermediate the ends of the lever there is a roller 308 riding in a cam groove in a cam cylinder 310 secured to the cam shaft 122.

To open and close the welder electrode carrying jaws, the following mechanism is employed: On the cam shaft 122 is another grooved disc cam 312 with downwardly facing cam groove in which rides a roller 314 secured intermediate the ends of a lever 316 which is secured at its rear end 317 to a vertical stub axle 318, Fig. 9, rotatable in bearings in the frame 100. The front end of the lever is flared in a vertical direction as indicated at 320 and has on the back face of the lever, see Fig. 8, a hardened wear plate 321 similar to the wear plate 276 on the flared end 274 of the lever arm 272.

Integral with the top of the cap 288 is a bearing ear 323 in which is fastened a pin 324 on which is pivoted a bell crank 326 provided with a roller 328 riding on the wear plate 321 of the flared end of lever 316. The other end of the bell crank is provided with an adjustable screw 330 engaging the top end of a thrust rod 332 slidable in shaft 286 and provided at its lower end with a downwardly tapering cone 334. A spring 336 reacts between a shoulder in shaft 286 and a collar 338 fast on rod 332 to urge the rod upwardly. The cone 334 is operative to separate the welder electrodes as will be described.

The foot 290 shown in block diagram in Fig. 7 and in detail in Figs. 14 and 16 is affixed to the lower end of the shaft by a strap 340 in a manner to prevent rotation of the foot relative to the shaft by applying the strap to a flat portion of the foot and shaft, as described above in connection with straps 216 and 292. As viewed in Fig. 16, the foot has a comparatively thin right hand extension 342 and a spaced comparatively thicker parallel extension 344. Mounted in these extensions is a bearing shaft 346 rotatably supporting arms 348 and 350, see also Fig. 15, of electrode holders. Arm 348 has integral with it a bearing 352 surrounding the shaft 346 and also an upstanding bar 354, Fig. 16, terminating in a second bearing 356 also surrounding the shaft 346. This double bearing construction affords excellent support for the arm 348 of the electrode holder. The other arm 350, similarly, has a bearing 358 surrounding the shaft 346 and a second spaced bar-connected bearing 360, the bar corresponding to bar 354 being on the back side of Fig. 16. All of these bearings are maintained spaced apart by suitable washers.

Each of the arms has an upstanding lug 362, Fig. 14, interconnected by a tensioned spring 364 tending to rotate the free electrode carrying ends of the arms toward each other, the rotation occurring about the shaft 346. The arms are separated against the action of the spring by depression of the rod 332 whereby the cone 334, see Figs. 14 and 15, engages antifriction rollers 366 in forked extensions 368 of the arms 348 and 350. The underfaces of the arms provide channels to receive electrode carrying bars 370 and 372, the bar 370 being insulated from the arm 348 by a suitable thin insulating sheet of fish paper 374 or the like laid in the groove in arm 348, the other arm being grounded. The bars 370 and 372 at their forward ends carry clamp blocks 376 to suitably clamp the electrodes 378. The electrodes may have suitable line end connectors 380 clamped to their ends to conduct current through the electrodes.

After the tab has been welded onto the electrodes, the welder unit is raised to allow turret indexing without injury to the mounts and subsequently the mounts are removed. Insofar as this invention is concerned, the mounts may be considered as removed manually.

In the sequence of operations, the cams are so contoured that after indexing of the turret, the feed jaws will grasp tab material immediately below the brake 140. At this time the cutter blades 186 are open to amply allow for passage therebetween of the feed jaws 238. Then the feed jaws move downwardly and momentarily stop while the cutter jaws cut off a piece of the tape above the feed jaws. The cutter opens again and the feed jaws move downwardly toward the mount on the indexed turret. In the meantime, the welder bars 370 and 372 will have moved down opposite the appropriate electrode on the mount ready to close the welding electrodes on the tab and mount electrode when the tab is brought down to proper position. After welding the tab onto the electrode, the feed jaws release the tab and move upward above the cutter blades, and the welder unit moves up close beneath the cutter blades to allow ample room for turret and mount indexing.

What is claimed is:

1. A material feeder, cutter, and welder comprising a horizontal support, a frame depending therefrom, means enabling adjustment of the frame with respect to the support in any direction in the plane of the support, means enabling rotational adjustment of the frame with respect to the support, interconnecting drive means on the support and frame, a material feeding means carried by said frame for feeding material downwardly of the frame, a cutter on the frame for cutting material so fed, a welder carried by the frame for attaching the so fed and cut material to an object, and means on the frame connected to the drive means thereon to operate the feeding means, cutter and welder, said adjustments of the frame with respect to the support being provided to enable the welder to reach any part of the object in a horizontal plane.

2. A cathode tab feeder and welder for assisting in assembling parts of an electron tube comprising a horizontal support, a vertically elongated frame mounted by said support, tab feeder jaws at the lower end of the frame extending laterally therefrom, welder jaws at the lower end of said frame also extending laterally therefrom, means for operating all of said jaws, means mounting said frame on said support for universal adjustment thereof in the plane of said support and means for rotationally adjusting the frame with respect to the support, all to enable the jaws to reach any desired horizontal position with respect to elements of the electron tube.

3. A cathode tab feeder, cutter and welder for assisting in assembling parts of an electron tube comprising a horizontal support, a vertically elongated frame carried by said support, a pair of tab feeder jaws, a pair of cutter blades, and a pair of welding electrodes supported by the lower end of the frame, means for operating the respective pairs of jaws, cutter blades and electrodes so as to cause the units of a pair to approach and recede from each other, the points of engagement of the units of respective pairs being in vertical alignment, means mounting said frame on said support for universal adjustment thereof in the plane of said support and means for rotationally adjusting the frame with respect to the support, all to enable the electrodes to reach any desired horizontal position with respect to elements of the electron tube.

4. A unit including a material feeder, cutter, and welder, said unit comprising a horizontal support, a frame depending therefrom, means enabling adjustment of the frame with respect to the support in any direction in the plane of the support, means enabling rotational adjustment of the frame with respect to the support, drive means on the support, interconnecting driven means on the frame coaxial with the axis of rotation of the frame, said driven means being hollow to afford downward passage therethrough of material to be handled by the unit, a drive shaft on the frame parallel to and offset from the axis of rotation of the frame, a pair of material feeding, cooperating jaws vertically slidably mounted on the frame, means under control of said drive shaft to move the cooperating jaws toward and from the said axis and vertically parallel to said axis, a pair of cooperating cutter blades mounted on the frame, means under control of said drive shaft to move the cutter blades toward and from said axis, a pair of cooperating welding electrodes vertically slidably mounted on said frame, means under control of said drive shaft to move the welding jaws toward and from the axis and vertically parallel to said axis, and an indexible article carrying mechanism below the welder electrodes.

5. A material feeder, cutter and welder comprising a frame, a vertical cam shaft mounted in said frame, a series of cams fastened along the length of said shaft, means at the lower end of said frame mounting a pair of cutter blades, means at the lower end of said frame slidably supporting a tape feed mechanism, said cutter blade mounting means accommodating the passage of said feed mechanism from above the cutter blades to below them, a welding unit having movable electrodes also slidably mounted on the lower end of the frame, and means connecting one of the cams with the cutter blades to open and close the same, means connecting another of the cams with the feed mechanism to cause it to engage and release material to be fed, means connecting still another of the cams with the feed mechanism to vertically move the same, means connected with yet another cam to move the electrodes toward and away from each other and means to raise and lower the welding unit.

6. A material feeder and cutter comprising a frame having a vertical passageway therethrough for the traverse of a tape, means for advancing said tape and means for cutting off said advanced tape, said advancing means comprising a hollow vertical shaft, a pair of tape gripping jaws pivotally mounted on the lower end of said shaft, means for raising and lowering the shaft and means for opening and closing the jaws, said last means including a slidable rod mounted in the hollow shaft with cam means at the lower end to engage the jaws to move them in one direction with spring means acting on the jaws to move them in the opposite direction, additional spring means to raise the rod and a bell crank mounted atop the shaft having an arm engaging the rod to shift the same downward, said bell crank having a cam follower on the other arm, a cam plate shiftable toward and from the cam follower to rotate the bell crank, said cam plate being of a vertical height sufficient to engage the cam follower on the bell crank arm in any vertical position of the shaft.

7. A material feeder and cutter comprising a frame, a driven vertical cam shaft on said frame, a pair of cams fixed on said shaft, said frame affording vertical passage therethrough of tab material to be cut into tab lengths, a pair of laterally spaced cutter blades carrying members mounted on the lower end of the frame, cooperating cutter blades at right angles to the carrying members and mounted on said members, means individual to each of the cams of the pair for oscillating the blade carrying members, tape gripping and advancing jaws vertically movable between the carrying members from a position above the blades to a position therebelow, means including a third cam on the shaft for so vertically moving the tape gripping and advancing jaws, means, also within the confines of the blade carrying members, for controlling the opening and closing of the last jaws and a cam on said shaft for operating said last means.

8. A tab feeder, cutter, and welder comprising a support, means for supporting a supply of tab forming material above the support, a frame suspended from the support, means for guiding the material through the support and frame, a brake at the lower end of the frame for retarding the free movement of the tab material, a cutter mounted on the frame below the brake, a material feeder movable to positions above and below the cutter to bring a new supply of material to a position where a tab may be cut off, means to operate the cutter and feeder, said last means bringing the cut off tab to a position where it may be welded onto a work piece, a welder vertically movable on the frame, means to move the welder, an indexible work holder, said welder being movable vertically to clear the movement of a work piece on the work holder, said means for moving the cutter, feeder, and welder comprising cams contoured to raise the feeder above the cutter and the welder to immediately below the cutter when the work holder is being indexed to afford ample room for work piece movement.

9. A frame, a hollow shaft slidable longitudinally of itself, a tool carried at the end of the shaft comprising two cooperative parts movable toward and from each other, spring means between the tool parts effective to perform one of the movements, and a rod passing through the shaft provided with a conical end engageable with the tool parts to control the other of said movements, means to shift the hollow shaft and means to operate the rod irrespective of the position of the shaft comprising a lever with an enlarged end, means to oscillate the lever about a vertical axis, a second lever mounted on the shaft having one end engaging the rod and the other end engaging said enlarged end of the first lever and movable therealong.

10. In a machine for feeding tab material, cutting tabs off the material, and welding the tabs on an article, a frame, a vertically apertured block mounted on the lower portion of the frame through which the material is fed, a pair of reciprocatable shafts mounted below the frame, and laterally of the block aperture, one carrying feeding jaws extending to below the aperture to engage tab material and the other shaft having welding jaws extending to below the aperture to weld the tab material to an article, means on the frame to vertically reciprocate the shafts and to operate the respective pairs of jaws, means on the shafts cooperating with elements fixed with respect to the frame to prevent shaft rotation, and cutter mechanism mounted on the frame to sever a tab from the tab material after the tab material has been grasped by the feeding jaws.

References Cited in the file of this patent

UNITED STATES PATENTS

| | | |
|---|---|---|
| 2,024,597 | Pfeiffer | Dec. 17, 1935 |
| 2,343,687 | Martindell | Mar. 7, 1944 |
| 2,388,754 | Martindell | Nov. 13, 1945 |
| 2,600,076 | Schelling | June 10, 1952 |